(12) United States Patent
Kuroda et al.

(10) Patent No.: US 11,655,384 B2
(45) Date of Patent: May 23, 2023

(54) WATER-BASED INK

(71) Applicant: KAO CORPORATION, Tokyo (JP)

(72) Inventors: Azusa Kuroda, Wakayama (JP); Yuta Matsumoto, Cincinnati, OH (US)

(73) Assignee: KAO CORPORATION, Tokyo (JP)

( * ) Notice: Subject to any disclaimer, the term of this patent is extended or adjusted under 35 U.S.C. 154(b) by 368 days.

(21) Appl. No.: 16/956,102

(22) PCT Filed: Dec. 12, 2018

(86) PCT No.: PCT/JP2018/045691
§ 371 (c)(1),
(2) Date: Jun. 19, 2020

(87) PCT Pub. No.: WO2019/131131
PCT Pub. Date: Jul. 4, 2019

(65) Prior Publication Data
US 2021/0071022 A1    Mar. 11, 2021

(30) Foreign Application Priority Data
Dec. 28, 2017 (JP) .............................. JP2017-254826

(51) Int. Cl.
| | | |
|---|---|---|
| C09D 11/107 | (2014.01) |
| C09D 11/322 | (2014.01) |
| C09D 11/38 | (2014.01) |
| C08K 5/053 | (2006.01) |
| C08K 5/54 | (2006.01) |
| B41J 2/21 | (2006.01) |
| B41M 5/00 | (2006.01) |
| C09D 11/326 | (2014.01) |
| C08F 220/28 | (2006.01) |
| C08F 212/08 | (2006.01) |
| C08F 220/06 | (2006.01) |
| C08K 5/00 | (2006.01) |
| C08K 5/103 | (2006.01) |
| C08K 5/1515 | (2006.01) |
| C08K 5/5415 | (2006.01) |
| C08K 9/10 | (2006.01) |

(52) U.S. Cl.
CPC ........... *C09D 11/326* (2013.01); *B41J 2/2107* (2013.01); *B41M 5/0064* (2013.01); *C08F 212/08* (2013.01); *C08F 220/06* (2013.01); *C08F 220/286* (2020.02); *C08K 5/0025* (2013.01); *C08K 5/0041* (2013.01); *C08K 5/053* (2013.01); *C08K 5/103* (2013.01); *C08K 5/1515* (2013.01); *C08K 5/5415* (2013.01); *C08K 9/10* (2013.01); *C09D 11/107* (2013.01); *C09D 11/38* (2013.01)

(58) Field of Classification Search
CPC ..... C09D 11/107; C09D 11/322; C09D 11/38; C08K 5/54
See application file for complete search history.

(56) References Cited

U.S. PATENT DOCUMENTS

| | | | |
|---|---|---|---|
| 8,992,675 B2 * | 3/2015 | Komatsu ................ | C09D 11/30 106/31.86 |
| 10,655,030 B2 * | 5/2020 | Takeno ................ | C09D 11/322 |
| 11,247,481 B2 * | 2/2022 | Matsumoto .......... | C09D 11/322 |
| 2011/0234682 A1 | 9/2011 | Ohta et al. | |
| 2013/0202861 A1 | 8/2013 | Ohta | |
| 2015/0174939 A1 | 6/2015 | Aoyama et al. | |
| 2015/0337149 A1 | 11/2015 | Wakabayashi | |
| 2017/0151780 A1 | 6/2017 | Masuda | |
| 2018/0187034 A1 | 7/2018 | Takeno et al. | |
| 2018/0236787 A1 | 8/2018 | Kagata et al. | |

FOREIGN PATENT DOCUMENTS

| | | | | |
|---|---|---|---|---|
| CN | 102199383 A | 9/2011 | | |
| EP | 3733423 A1 | 11/2020 | | |
| GB | 2110598 A * | 6/1983 | ............. | B41F 23/00 |
| JP | 2011-195763 A | 10/2011 | | |
| JP | 2012-167227 A | 9/2012 | | |
| JP | 2012-213950 A | 11/2012 | | |
| JP | 2013-146925 A | 8/2013 | | |
| JP | 2014-139004 A | 7/2014 | | |
| JP | 2015-143003 A | 8/2015 | | |
| JP | 2016-105066 A | 6/2016 | | |
| JP | 2016-165872 A | 9/2016 | | |
| JP | 2017-105159 A | 6/2017 | | |
| JP | 2017-137389 A | 8/2017 | | |
| JP | 2017-189980 A | 10/2017 | | |
| JP | 2018-134801 A | 8/2018 | | |
| JP | 2018-154805 A | 10/2018 | | |
| WO | WO 2016/208719 A1 | 12/2016 | | |

(Continued)

OTHER PUBLICATIONS

Extended European Search Report for European Application No. 18885962.1, dated Sep. 2, 2021.

(Continued)

*Primary Examiner* — Vu A Nguyen
(74) *Attorney, Agent, or Firm* — Birch, Stewart, Kolasch & Birch, LLP

(57) ABSTRACT

The present invention relates to a water-based ink containing a pigment (A), a water-soluble organic solvent (C), a surfactant (D) and water, in which a content of water in the water-based ink is not less than 40% by mass and not more than 65% by mass, a boiling point of the water-soluble organic solvent (C) is not higher than 230° C., and a content of a high-boiling point organic solvent having a boiling point of not lower than 250° C. in the water-based ink is not more than 4% by mass, and the surfactant (D) contains a silicone-based surfactant (d-1) and an acetylene glycol-based surfactant (d-2) which satisfy the following conditions 1 and 2: Condition 1: [(content of component (d-1))/(content of component (C))]×100=0.15 to 4; and Condition 2: [(content of component (d-2))/(content of component (C))]×100=0.35 to 1.65. In accordance with the present invention, it is possible to form ink dots having a complete circular shape and produce a printed material that is excellent in solid image fillability, image quality and rub fastness even when printed on a low-liquid absorbing printing medium.

17 Claims, No Drawings

(56) References Cited

FOREIGN PATENT DOCUMENTS

| WO | WO 2017/213260 A1 | 12/2017 |
| WO | WO 2017/217540 A1 | 12/2017 |
| WO | WO 2017/217541 A1 | 12/2017 |
| WO | WO 2017/217544 A1 | 12/2017 |

OTHER PUBLICATIONS

International Search Report, issued in PCT/JP2018/045691, dated Feb. 26, 2019.

* cited by examiner

WATER-BASED INK

FIELD OF THE INVENTION

The present invention relates to a water-based ink and a printing method using the water-based ink.

BACKGROUND OF THE INVENTION

In ink-jet printing methods, droplets of ink are directly ejected onto a printing medium from very fine nozzles and allowed to adhere to the printing medium to form characters or images thereon. The ink-jet printing methods have become rapidly spread because of various advantages such as easiness of full coloration, low cost, capability of using a plain paper as the printing medium, non-contact with the printed characters or images, etc.

As a water-based ink for ink-jet printing, there has been extensively used a pigment ink prepared by dispersing pigment fine particles in a water-based medium. However, the pigment ink has posed such a problem that since the pigment fine particles are generally deteriorated in dispersion stability in the water-based medium, flocculation between the pigment fine particles tends to occur, so that the resulting ink tends to suffer from turbulence of ejection from nozzles and therefore tends to be deteriorated in ejection stability.

On the other hand, it has been required to print characters or images not only on a high-liquid absorbing printing medium such as those printing media conventionally called a plain paper and a copying paper, etc., but also on a printing medium for commercial printing purposes such as a low-liquid absorbing coated paper such as an offset coated paper or a non-liquid absorbing resin film such as a polyvinyl chloride resin film, a polypropylene resin film, a polyester resin film, etc.

It is known that when characters or images are printed on the low-liquid absorbing or non-liquid absorbing printing medium by the ink-jet printing methods, there tend to occur problems such as prolonged drying time of the printed characters or images owing to slow absorption or no absorption of liquid components of the ink into the printing medium, and deterioration in rub fastness thereof in an initial stage of the printing.

Hitherto, when printing characters or images on the low-liquid absorbing or non-liquid absorbing printing medium, a solvent-based pigment ink using an organic solvent as a dispersing medium or a UV-curing ink has been mainly employed. However, at the present time, there is an increasing demand for a water-based ink having a less burden on working environments and natural environments as well as a printing method using such a water-based ink.

For example, JP 2017-105159A (Patent Literature 1) discloses a water-based ink used in an ink-jet printing method which is excellent in ejection stability and capable of forming good printed characters or images, and contains water, a colorant, a surfactant and an organic solvent, in which a dynamic surface tension of the ink is higher than a static surface tension thereof. In the Patent Literature 1, it is also described that a plain paper, a glossy coated paper, a special paper, a cloth, a film, an OHP sheet, a versatile printing paper, etc., are used as a printing medium.

JP 2017-189980A (Patent Literature 2) discloses a printing method capable of suppressing occurrence of image defects in which a water-based ink containing a colorant, polymer particles, water and an aqueous organic solvent and having a static surface tension of 22 to 30 mN/m and a dynamic surface tension that lies within a specific range as measured by a maximum bubble pressure method is ejected in an ink droplet amount of less than 10 pL onto a non-permeable printing medium.

SUMMARY OF THE INVENTION

The present invention relates to a water-based ink containing a pigment (A), a water-soluble organic solvent (C), a surfactant (D) and water, in which;

a content of water in the water-based ink is not less than 40% by mass and not more than 65% by mass, a boiling point of the water-soluble organic solvent (C) is not higher than 230° C., and a content of a high-boiling point organic solvent having a boiling point of not lower than 250° C. in the water-based ink is not more than 4% by mass; and the surfactant (D) contains a silicone-based surfactant (d-1) and an acetylene glycol-based surfactant (d-2) which satisfy the following conditions 1 and 2;

[(content of component $(d\text{-}1)$)/(content of component (C))]×100=0.15 to 4; and      Condition 1;

[(content of component $(d\text{-}2)$)/(content of component (C))]×100=0.35 to 1.65.      Condition 2;

DETAILED DESCRIPTION OF THE INVENTION

When characters or images are printed on the low-liquid absorbing printing medium, the water-based ink is dried slower than a solvent-based pigment ink using a low-boiling point organic solvent as a dispersing medium thereof, and cured slower than a UV-curing ink. For this reason, even though the water-based ink is improved in wet-spreadability over the low-liquid absorbing printing medium, there has been such a tendency that the water-based ink fails to spread into a complete circular shape over the printing medium, but spreads non-uniformly thereover, and therefore suffers from deterioration in image quality in view of solid image fillability and rub fastness thereof.

An object of the present invention is to provide a water-based ink that is capable of forming ink dots having a complete circular shape and providing a printed material that is excellent in solid image fillability, image quality and rub fastness even when printed on a low-liquid absorbing printing medium, and a printing method using the water-based ink.

The present inventors have found that in the water-based ink containing a pigment, a water-soluble organic solvent and a surfactant, by well controlling an amount of water, a boiling point of the water-soluble organic solvent and contents of a silicone-based surfactant and an acetylene glycol-based surfactant in the water-soluble organic solvent, it is possible to solve the aforementioned conventional problems.

That is, the present invention relates to the following aspects [1] and [2].

[1] A water-based ink containing a pigment (A), a water-soluble organic solvent (C), a surfactant (D) and water, in which;

a content of water in the water-based ink is not less than 40% by mass and not more than 65% by mass, a boiling point of the water-soluble organic solvent (C) is not higher than 230° C., and a content of a high-boiling point organic solvent having a boiling point of not lower than 250° C. in the water-based ink is not more than 4% by mass; and the surfactant (D) contains a silicone-based surfactant (d-1) and an acetylene glycol-based surfactant (d-2) which satisfy the following conditions 1 and 2;

[(content of component (d-1))/(content of component (C))]×100=0.15 to 4; and      Condition 1;

[(content of component (d-2))/(content of component (C))]×100=0.35 to 1.65.      Condition 2;

[2] A printing method including the step of printing characters or images on a low-liquid absorbing printing medium using the water-based ink according to the above aspect [1].

In accordance with the present invention, it is possible to provide a water-based ink that is capable of forming ink dots having a complete circular shape and providing a printed material that is excellent in solid image fillability, image quality and rub fastness even when printed on a low-liquid absorbing printing medium, and a printing method using the water-based ink.

Meanwhile, the term "printing" as used in the present specification means a concept that includes printing or typing operation for printing characters or images, and the term "printed material" as used in the present specification means a concept that includes printed matters or typed materials on which characters or images are printed.

In addition, the term "low-liquid absorbing" as used in the present specification is intended to include both concepts of low-liquid absorbing properties and non-liquid absorbing properties of a printing medium for water and/or ink, and the "low-liquid absorbing" may be evaluated by a water absorption of the printing medium as measured using pure water. More specifically, the "low-liquid absorbing" means that the printing medium has a water absorption of not less than 0 g/m$^2$ and not more than 10 g/m$^2$, preferably not less than 0 g/m$^2$ and not more than 6 g/m$^2$, as measured under the condition that a contact time between the printing medium and pure water is 100 milliseconds. Incidentally, the aforementioned water absorption of the printing medium may be measured by the method described in Examples below.

[Water-Based Ink]

The water-based ink of the present invention (hereinafter also referred to merely as an "ink") is characterized by containing a pigment (A), a water-soluble organic solvent (C), a surfactant (D) and water, in which:

a content of water in the water-based ink is not less than 40% by mass and not more than 65% by mass, a boiling point of the water-soluble organic solvent (C) is not higher than 230° C., and a content of a high-boiling point organic solvent having a boiling point of not lower than 250° C. in the water-based ink is not more than 4% by mass; and the surfactant (D) contains a silicone-based surfactant (d-1) and an acetylene glycol-based surfactant (d-2) which satisfy the following conditions 1 and 2:

[(content of component (d-1))/(content of component (C))]×100=0.15 to 4; and      Condition 1;

[(content of component (d-2))/(content of component (C))]×100=0.35 to 1.65.      Condition 2;

The water-based ink of the present invention has such an advantageous effect that the water-based ink is capable of forming ink dots having a complete circular shape and exhibiting excellent solid image fillability, image quality and rub fastness even when printed on a low-liquid absorbing printing medium. The reason why the aforementioned advantageous effect can be attained by the present invention is considered as follows though it is not clearly determined yet.

That is, in order to print characters or images on a low-liquid absorbing printing medium using the water-based ink, it is necessary that the ink is allowed to wet-spread uniformly over the printing medium.

The low-liquid absorbing printing medium has poor affinity to water. Therefore, in order to spread the ink over the printing medium, a water-soluble organic solvent having good affinity to the printing medium and a surfactant for improving affinity between the printing medium and water can be used in the ink. However, in this case, even if the surfactant is merely added to the ink containing the water-soluble organic solvent to improve the affinity between the printing medium and water, the ink tends to hardly spread uniformly over the printing medium. For example, even when dots of the ink are printed by an ink-jet printing method, the printed dots tend to sometimes have not a circular shape, but a distorted non-uniform shape. The reason why such a defect occurs is estimated such that when the ink is spreading over the printing medium while adsorbing the surfactant onto the surface of the printing medium, if the adsorbing velocity of the surfactant to the printing medium is slower than the spreading velocity of the ink thereover, the adsorbing points of the surfactant tend to be interspersed on the printing medium, so that the ink is likely to spread non-uniformly thereover. On the other hand, it is estimated that if the adsorbing velocity of the surfactant is faster than the spreading velocity of the ink, the ink exhibits excessively high wet-spreadability owing to a large amount of the surfactant present on the surface of the printing medium, and therefore is likely to spread non-uniformly over the printing medium.

In this case, when two kinds of surfactants, i.e., the silicone-based surfactant (d-1) and the acetylene glycol-based surfactant (d-2) which are different in adsorbing velocity to the surface of the printing medium from each other are used as the surfactant in the water-based ink containing a specific amount of water so as to satisfy the conditions 1 and 2 on the basis of the water-soluble organic solvent (C) having a boiling point of not higher than 230° C., it is considered that the acetylene glycol-based surfactant (d-2) having a comparatively high adsorbing velocity is first adsorbed onto the surface of the printing medium, and then the silicone-based surfactant (d-1) having a comparatively slow adsorbing velocity is adsorbed to the adsorbing points of the surfactant (d-2) on the printing medium. In addition, it is considered that when the silicone-based surfactant (d-1) is adsorbed to the adsorbing points, the acetylene glycol-based surfactant (d-2) already adsorbed thereon is supplied again to the surface of the printing medium over which the ink has been allowed to spread. That is, it is considered that the amount of the surfactant adsorbed and the amount of the surfactant supplied when allowing the ink to spread over the printing medium are controlled to form uniform adsorbing points of the surfactant on the printing medium, so that the water-based ink is allowed to spread uniformly into a complete circular shape while filling a solid image on the printing medium to thereby obtain good printed characters or images. Furthermore, it is considered that since the ink is allowed to uniformly spread over the printing medium, it is possible to form uniform printed characters or images and improve rub fastness of the printed characters or images.

In addition, it is considered that if an excessively large amount of water is used, the effect given by the water-soluble organic solvent (C), i.e., the effect of controlling the amount of the surfactant adsorbed, tends to be deteriorated, and if the ratio of the content of the silicone-based surfactant (d-1) to the content of the water-soluble organic solvent (C)

is small, the wettability of the printing medium with the water-based ink tends to be deteriorated, whereas if the ratio of the content of the acetylene glycol-based surfactant (d-2) to the content of the water-soluble organic solvent (C) is excessively large, the wet-spreadability of the water-based ink tends to become excessively high.

The water-based ink of the present invention contains a pigment (A), a water-soluble organic solvent (C) having a boiling point of not higher than 230° C., a surfactant (D) and water.

The term "water-based" as used herein means that a content of water in the ink is not less than 40% by mass. In the present invention, the content of water in the water-based ink is not more than 65% by mass, and water and the water-soluble organic solvent (C) having a boiling point of not higher than 230° C. are contained as a dispersing medium of the ink, and further the content of a high-boiling point organic solvent having a boiling point of not lower than 250° C. in the ink is not more than 4% by mass.

The water-based ink of the present invention is excellent in solid image fillability, image quality and rub fastness, and therefore can be suitably used for flexographic printing, gravure printing or ink-jet printing. In addition, the water-based ink of the present invention is excellent in uniform spreadability of droplets of the ink over the printing medium when used in ink-jet printing methods, and therefore is preferably used as a water-based ink for ink-jet printing.

<Pigment (A)>

The pigment used in the present invention may be either an inorganic pigment or an organic pigment. The inorganic or organic pigment may also be used in combination with an extender pigment, if required.

Examples of the inorganic pigment include carbon blacks, metal oxides such as titanium oxide, etc., metal sulfides, metal chlorides and the like. Of these inorganic pigments, in particular, carbon blacks are preferably used for black inks. Examples of the carbon blacks include furnace blacks, thermal lamp blacks, acetylene blacks, channel blacks and the like.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like. The hue of the organic pigment used in the present invention is not particularly limited, and there may be used any chromatic pigments having a yellow color, a magenta color, a cyan color, a blue color, a red color, an orange color, a green color, etc. Specific examples of the preferred chromatic organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green with various product numbers.

The average particle size of the pigment is preferably not less than 60 nm and not more than 180 nm form the viewpoint of improving tinting power and dispersion stability of the resulting ink.

The aforementioned pigments may be used alone or in the form of a mixture of any two or more thereof.

The pigment used in the present invention may be used in at least one configuration selected from the group consisting of (i) a self-dispersible pigment, and (ii) pigment particles formed by dispersing the pigment with a polymer (B) as a polymer dispersant.

Among these configurations of the pigment, from the viewpoint of forming ink dots having a complete circular shape and improving image quality and rub fastness of the resulting printed material, the pigment is more preferably contained in the water-based ink in the form of particles of a water-insoluble polymer (bx) containing the pigment.

(i) Self-Dispersible Pigment

The self-dispersible pigment means a pigment onto a surface of which at least one hydrophilic functional group (including an anionic hydrophilic group such as a carboxy group, etc., or a cationic hydrophilic group such as a quaternary ammonium group, etc.) is bonded either directly or through the other atom group such as an alkanediyl group having 1 to 12 carbon atoms, etc., to thereby render the pigment dispersible in a water-based medium without using a surfactant or a resin.

Specific examples of commercially available products of the self-dispersible pigment include "CAB-O-JET" series products available from Cabot Japan K.K., and the like. The self-dispersible pigment is preferably used in the form of a pigment water dispersion prepared by dispersing the pigment in water.

(ii) Pigment Particles Formed by Dispersing Pigment with Polymer (B)

Examples of the particles formed by dispersing the pigment with the polymer (B) include 1) particles formed by kneading the pigment and the polymer and then dispersing the resulting kneaded material in a medium such as water, etc.; 2) particles formed by stirring the pigment and the polymer in a medium such as water, etc., to disperse the pigment in the medium such as water, etc.; 3) particles formed by mechanically dispersing a polymer raw material and the pigment to polymerize the polymer raw material and then dispersing the pigment in a medium such as water, etc., with the resulting polymer; and the like.

In addition, from the viewpoint of improving storage stability of the pigment particles in the resulting water-based ink, a crosslinking agent may be added to the particles formed by dispersing the pigment with the polymer to subject the polymer to crosslinking reaction.

The preferred embodiment of the particles of the water-insoluble polymer (bx) containing the pigment is described in detail hereinlater.

<Polymer (B)>

The water-based ink of the present invention may also contain the polymer (B).

The polymer (B) may be used as a pigment dispersing polymer (b-1) for dispersing the pigment and a fixing aid polymer (b-2) for improving fixing properties of the resulting printed characters or images. These polymers (b-1) and (b-2) may also be used in combination with each other. In the case where the pigment other than the self-dispersible pigment is used, from the viewpoint of improving storage stability of the resulting water-based ink, the polymer (B) is preferably used as the pigment dispersing polymer (b-1) for dispersing the pigment.

As the polymer (B), there may be mentioned at least one polymer selected from the group consisting of condensation-based resins such as polyurethanes and polyesters, etc.; and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins, etc. Among these polymers, preferred are vinyl-based polymers.

The weight-average molecular weight of the polymer (B) is preferably not less than 10,000, more preferably not less than 20,000, even more preferably not less than 30,000 and further even more preferably not less than 40,000, and is also preferably not more than 2,500,000 and more preferably not more than 1,000,000, from the viewpoint of forming ink dots having a complete circular shape and improving image quality of the resulting printed material.

[Pigment Dispersing Polymer (b-1)]

As the pigment dispersing polymer (b-1), there may be mentioned at least one polymer selected from the group consisting of condensation-based resins such as polyesters, polyurethanes, etc.; and vinyl-based polymers, etc. Among these polymers, from the viewpoint of improving dispersion stability of the pigment, preferred are vinyl-based polymers containing the below-mentioned constitutional units, which are obtained by addition-polymerizing a vinyl monomer (such as a vinyl compound, a vinylidene compound and a vinylene compound). The pigment dispersing polymer (b-1) used herein may be in the form of either an appropriately synthetized product or a commercially available product.

The weight-average molecular weight of the vinyl-based polymer as the pigment dispersing polymer (b-1) is preferably not less than 10,000, more preferably not less than 20,000, even more preferably not less than 30,000 and further even more preferably not less than 40,000, and is also preferably not more than 500,000, more preferably not more than 300,000 and even more preferably not more than 200,000, from the viewpoint of improving dispersion stability of the pigment.

[Fixing Aid Polymer (b-2)]

The fixing aid polymer (b-2) is preferably used in the form of pigment-free polymer particles. The dispersion of the fixing aid polymer (b-2) serves for forming a film of the ink on a printing medium to thereby improve fixing properties of the ink.

As the fixing aid polymer (b-2), there may be mentioned at least one polymer selected from the group consisting of condensation-based resins such as polyurethanes and polyesters, etc.; and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins, etc. Among these polymers, from the viewpoint of promoting drying of the ink on a printing medium and improving fixing properties of the resulting printed characters or images thereon, preferred are acrylic resins.

In addition, from the viewpoint of enhancing productivity of the water-based ink, the fixing aid polymer (b-2) is preferably used in the form of a dispersion liquid containing the polymer particles. As the fixing aid polymer (b-2), there may be used either synthetized products obtained, for example, by emulsion polymerization method, etc., or commercially available products.

Examples of the commercially available products of the fixing aid polymer (b-2) include acrylic resins such as "Neocryl A1127" (anionic self-crosslinkable aqueous acrylic resin) available from DSM NeoResins, Inc., "JONCRYL 390" available from BASF Japan, Ltd., etc.; urethane resins such as "WBR-2018" and "WBR-2000U" both available from Taisei Fine Chemical Co., Ltd., etc.; styrene-butadiene resins such as "SR-100" and "SR-102" both available from Nippon A & L Inc., etc.; styrene-acrylic resins such as "JONCRYL 7100", "JONCRYL 7600", "JONCRYL 537J", "JONCRYL 538J", "JONCRYL 780" and "JONCRYL PDX-7164" all available from BASF Japan, Ltd., etc.; and vinyl chloride-based resins such as "VINYBLAN 700" and "VINYBLAN 701" both available from Nissin Chemical Co., Ltd., etc.

The fixing aid polymer (b-2) may be used in the form of particles dispersed in water.

The weight-average molecular weight of the fixing aid polymer (b-2) is preferably not less than 10,000, more preferably not less than 20,000 and even more preferably not less than 30,000, and is also preferably not more than 2,500,000 and more preferably not more than 1,000,000, from the viewpoint of improving fixing properties of the resulting ink.

In addition, the average particle size of particles of the fixing aid polymer (b-2) in the dispersion or ink containing the particles of the fixing aid polymer (b-2) is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

<Water-Insoluble Polymer (bx)>

The water-insoluble polymer (bx) is preferably used in the from of water-insoluble polymer particles containing the pigment (hereinafter also referred to merely as "pigment-containing polymer particles") from the viewpoint of improving dispersibility of the pigment as well as from the viewpoint of forming ink dots having a complete circular shape and improving image quality of the resulting printed material.

The term "water-insoluble" as used herein means that a polymer does not become transparent when dispersing the polymer in water. More specifically, the "water-insoluble" means that when the polymer is dried to a constant weight at 105° C. for 2 hours and then dissolved in 100 g of ion-exchanged water at 25° C. until reaching a saturated concentration thereof, the solubility in water of the polymer is less than 10 g, preferably not more than 5 g and more preferably not more than 1 g. In the case where the water-insoluble polymer (bx) is an anionic polymer, the solubility in water of the polymer is the value measured under such a condition that anionic groups of the polymer are neutralized completely (100%) with NaOH.

As the water-insoluble polymer (bx), from the same viewpoint as described above, preferred is a vinyl-based polymer obtained by addition-polymerizing a vinyl monomer. The vinyl-based polymer is preferably a vinyl-based polymer that is produced by copolymerizing a monomer mixture containing an ionic monomer (bx-1) and a hydrophobic monomer (bx-2). The vinyl-based polymer contains a constitutional unit derived from the component (bx-1) and a constitutional unit derived from the component (bx-2). Among them, it is preferred that the vinyl-based polymer further contains at least one constitutional unit selected from the group consisting of a constitutional unit derived from a macromonomer (bx-3) and a constitutional unit derived from a nonionic monomer (bx-4).

(Ionic Monomer (bx-1))

Examples of the ionic monomer (bx-1) include anionic monomers and cationic monomers. Among these monomers, preferred are anionic monomers. Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, 2-methacryloyloxymethyl-succinic acid and the like. Among the aforementioned anionic monomers, from the viewpoint of improving dispersion stability of the pigment-containing polymer particles in the ink, preferred are the carboxylic acid monomers, and more preferred are acrylic acid and methacrylic acid.

(Hydrophobic Monomer (bx-2))

As the hydrophobic monomer (bx-2), there may be mentioned at least one monomer selected from the group consisting of alkyl (meth)acrylic acid esters, aromatic group-containing monomers and the like.

The alkyl (meth)acrylic acid esters are preferably those alkyl (meth)acrylic acid esters containing an alkyl group having 1 to 22 carbon atoms. Examples of the alkyl (meth)acrylic acid esters include methyl (meth)acrylate, ethyl (meth)acrylate, propyl (meth)acrylate, butyl (meth)acrylate, amyl (meth)acrylate, cyclohexyl (meth)acrylate, 2-ethylhexyl (meth)acrylate, octyl (meth)acrylate, decyl (meth)acrylate, dodecyl (meth)acrylate, (iso)stearyl (meth)acrylate and the like.

Meanwhile, the term "(meth)acrylate" as used herein means at least one compound selected from the group consisting of an acrylate and a methacrylate, and the term "(meth)" described hereinafter also has the same meaning as described here. In addition, the term "(iso)" means both the structure in which any group expressed by "iso" is present, and the structure in which any group expressed by "iso" is not present (i.e., normal).

The aromatic group-containing monomer is preferably a vinyl monomer containing an aromatic group having 6 to 22 carbon atoms which may contain a substituent group containing a hetero atom, and more preferably a styrene-based monomer and an aromatic group-containing (meth)acrylic acid ester.

As the styrene-based monomer, preferred are styrene, 2-methyl styrene and divinyl benzene, and more preferred is styrene. As the aromatic group-containing (meth)acrylic acid ester, preferred are benzyl (meth)acrylate and phenoxyethyl (meth)acrylate, etc., and more preferred is benzyl (meth)acrylate.

(Macromonomer (bx-3))

The macromonomer (bx-3) is a compound containing a polymerizable functional group at one terminal end thereof and having a number-average molecular weight of not less than 500 and not more than 100,000. The polymerizable functional group bonded to one terminal end of the macromonomer is preferably an acryloyloxy group or a methacryloyloxy group.

The macromonomer (bx-3) preferably has a number-average molecular weight of not less than 1,000 and not more than 10,000. Meanwhile, the number-average molecular weight may be measured by gel permeation chromatography using polystyrenes as a reference standard substance.

As the macromonomer (bx-3), from the viewpoint of improving dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include the same aromatic group-containing monomers as described as to the aforementioned hydrophobic monomer (bx-2). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., and the like.

(Nonionic Monomer (bx-4))

From the viewpoint of improving dispersion stability of the ink and image quality of the resulting printed material, the nonionic monomer (bx-4) is preferably used as a monomer component of the polymer.

Examples of the nonionic monomer (bx-4) include polyalkylene glycol (meth)acrylates such as polypropylene glycol (n=2 to 30 wherein n represents an average molar number of addition of oxyalkylene groups: hereinafter defined in the same way) (meth)acrylate, polyethylene glycol (n=2 to 30) (meth)acrylate, etc.; alkoxy polyalkylene glycol (meth)acrylates such as methoxy polyethylene glycol (n=1 to 30) (meth)acrylate, etc.; polyalkylene glycol (meth)acrylates such as phenoxy (ethylene glycol/propylene glycol copolymer) (n=1 to 30 in which n for ethylene glycol: 1 to 29) (meth)acrylate, etc.; and 2-hydroxyethyl (meth)acrylate, 3-hydroxypropyl (meth)acrylate, etc. Among these nonionic monomers, preferred is at least one compound selected from the group consisting of polypropylene glycol (n=2 to 30) (meth)acrylate, polyethylene glycol (n=2 to 30) (meth)acrylate and methoxy polyethylene glycol (n=1 to 30) (meth)acrylate.

Specific examples of commercially available products of the component (bx-4) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation.

The aforementioned components (bx-1) to (bx-4) may be respectively used alone or in the form of a mixture of any two or more thereof.

The contents of the constitutional units derived from the components (bx-1) to (bx-4) in the water-insoluble polymer (bx) are as follows, from the viewpoint of improving dispersion stability of the pigment-containing polymer particles in the resulting ink.

The content of the component (bx-1) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

The content of the component (bx-2) is preferably not less than 25% by mass, more preferably not less than 30% by mass and even more preferably not less than 35% by mass, and is also preferably not more than 60% by mass, more preferably not more than 55% by mass and even more preferably not more than 50% by mass.

The content of the component (bx-3) is not less than 0% by mass, preferably not less than 5% by mass, more preferably not less than 8% by mass and even more preferably not less than 10% by mass, and is also preferably not more than 30% by mass, more preferably not more than 25% by mass and even more preferably not more than 20% by mass.

The content of the component (bx-4) is not less than 0% by mass, preferably not less than 5% by mass, more preferably not less than 10% by mass and even more preferably not less than 15% by mass, and is also preferably not more than 50% by mass, more preferably not more than 45% by mass and even more preferably not more than 40% by mass.

[Production of Water-Insoluble Polymer (bx)]

The water-insoluble polymer (bx) may be produced by copolymerizing the aforementioned monomers by known polymerization methods, for example, by a solution polymerization method. The water-insoluble polymer (bx) thus produced is preferably used as such in the form of a water-insoluble polymer solution without removing the solvent used in the polymerization reaction therefrom in order to use the organic solvent contained therein as an organic solvent in the below-mentioned step 1, from the viewpoint of enhancing productivity of the below-mentioned water dispersion of the pigment-containing polymer particles.

The weight-average molecular weight of the water-insoluble polymer (bx) is preferably not less than 10,000, more preferably not less than 20,000 and even more preferably not less than 30,000, and is also preferably not more than 500,000, more preferably not more than 300,000, even more preferably not more than 200,000 and further even more preferably not more than 150,000, from the viewpoint of forming ink dots having a complete circular shape and improving image quality and rub fastness of the resulting printed material.

Examples of the configuration of the water-insoluble polymer (bx) present in the water-based ink include the particle configuration in which the pigment is enclosed (or encapsulated) in the polymer, the particle configuration in which the pigment is uniformly dispersed in the polymer, the particle configuration in which the pigment is exposed onto a surface of the respective polymer particles, the configuration in which the polymer is adsorbed onto the pigment, and the configuration in which the polymer is not adsorbed onto the pigment, etc., as well as mixtures of these configurations. Among these configurations, from the viewpoint of improving dispersion stability of the pigment, in the present invention, the water-insoluble polymer (bx) is preferably used in the form of pigment-containing polymer particles, and more preferably used in the pigment-enclosing configuration in which the pigment is enclosed in the water-insoluble polymer (bx).

[Production of Particles of Water-Insoluble Polymer (Bx) Containing Pigment (Pigment-Containing Polymer Particles)]

The pigment-containing polymer particles can be efficiently produced in the form of a water dispersion thereof by the process including the following steps I and II, and further including the following step III an an optional step, if required.

Step I; subjecting a mixture containing the water-insoluble polymer (bx), an organic solvent, the pigment and water (hereinafter also referred to merely as a "pigment mixture") to dispersion treatment to obtain a dispersion of the pigment-containing polymer particles;

Step II; removing the organic solvent from the dispersion obtained in the step I to obtain a water dispersion of the pigment-containing polymer particles (hereinafter also referred to merely as a "pigment water dispersion"); and Step III; mixing the water dispersion obtained in the step II with a crosslinking agent to subject the water dispersion to crosslinking treatment, thereby obtaining a water dispersion containing the crosslinked pigment-containing polymer particles.

(Step I)

In the step I, there is preferably used the method in which the water-insoluble polymer (bx) is first dissolved in the organic solvent, and then the pigment and water, if required together with a neutralizing agent, a surfactant and the like, are added to and mixed in the resulting organic solvent solution to obtain a dispersion of an oil-in-water type.

The organic solvent in which the water-insoluble polymer (bx) can be dissolved is not particularly limited. When the water-insoluble polymer is synthesized by the solution polymerization method, the solvent used in the polymerization method may be directly used as such in the step I.

In the case where the water-insoluble polymer (bx) is an anionic polymer, an anionic group contained in the water-insoluble polymer may be neutralized using a neutralizing agent. Examples of the neutralizing agent include hydroxides of alkali metals, ammonia, organic amines and the like.

The method of conducting the dispersion treatment in the step I is not particularly limited. It is preferred that the pigment mixture is first subjected to preliminary dispersion treatment, and then to substantial dispersion treatment by applying a shear stress thereto so as to control the average particle size of the obtained pigment particles to a desired value. Examples of the disperser used in the preliminary dispersion treatment include ordinary mixing and stirring devices such as anchor blades, disper blades and the like. Of these devices, preferred are high-speed stirring mixers.

Examples of the disperser used in the substantial dispersion treatment include kneading machines such as roll mills, kneaders, etc., high-pressure homogenizers such as "MICROFLUIDIZER" available from Microfluidics Corporation, etc., and media-type dispersers such as paint shakers, beads mills, etc. Among these devices, from the viewpoint of reducing a particle size of the pigment, the high-pressure homogenizers are preferably used. In the case where the substantial dispersion treatment is conducted using the high-pressure homogenizer, the particle size of the pigment can be adjusted to a desired value by controlling the treating pressure and the number of passes through the homogenizer.

(Step II)

In the step II, the organic solvent is removed from the dispersion obtained in the step I by any conventionally known methods to obtain the pigment water dispersion. The organic solvent is preferably substantially completely removed from the thus obtained pigment water dispersion. However, a small amount of the residual organic solvent may be present in the pigment water dispersion unless the objects and advantageous effects of the present invention are adversely affected by the residual organic solvent.

In the thus obtained pigment water dispersion, the water-insoluble polymer (bx) particles in the form of solids containing the pigment are dispersed in a medium containing water as a main medium. The configuration of the pigment-containing polymer particles in the pigment water dispersion is not particularly limited, and the pigment-enclosing configuration in which the pigment is enclosed in the polymer is preferred as described previously.

(Step III)

The step III is an optional step. However, the step III is preferably carried out from the viewpoint of improving storage stability of the pigment water dispersion and the resulting ink.

In the case where the water-insoluble polymer (bx) is an anionic water-insoluble polymer containing an anionic group, the crosslinking agent used in the step III is preferably in the form of a compound containing a functional group that is capable of reacting with the anionic group of the polymer, more preferably a compound containing the two or more functional groups in a molecule thereof, and even more preferably a compound containing the 2 to 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are compounds containing two or more epoxy groups in a molecule thereof, and more preferred is trimethylolpropane polyglycidyl ether.

The solid content of the resulting pigment water dispersion is preferably not less than 10% by mass and more preferably not less than 15% by mass, and is also preferably not more than 35% by mass and more preferably not more than 30% by mass, from the viewpoint of improving dispersion stability of the pigment water dispersion, etc.

Meanwhile, the solid content of the pigment water dispersion may be measured by the method described in Examples below.

The average particle size of the pigment-containing polymer particles in the pigment water dispersion is preferably not less than 40 nm, more preferably not less than 60 nm, even more preferably not less than 80 nm and further even more preferably not less than 85 nm, and is also preferably not more than 150 nm, more preferably not more than 130 nm and even more preferably not more than 125 nm, from the viewpoints of suppressing formation of coarse particles and improving continuous ejection properties of the resulting ink.

Meanwhile, the average particle size of the pigment-containing polymer particles may be measured by the method described in Examples below.

<Water-Soluble Organic Solvent (C)>

The water-soluble organic solvent (C) may be used in order to enhance drying properties of the water-based ink, and improving stability of the water-based ink and affinity thereof to a low-liquid absorbing printing medium. The "water-soluble organic solvent" as used herein means such an organic solvent whose solubility in water as measured by dissolving the organic solvent in 100 g of ion-exchanged water at 25° C. until reaching a saturated concentration thereof is not less than 10 g.

The boiling point of the water-soluble organic solvent (C) is not higher than 230° C., preferably not higher than 210° C. and more preferably not higher than 200° C., and is also preferably not lower than 90° C., more preferably not lower than 130° C. and even more preferably not lower than 140° C., from the viewpoint of forming ink dots having a complete circular shape and improving image quality and rub fastness of the resulting printed material.

In addition, in the water-based ink of the present invention, from the viewpoint of improving drying properties of the ink and enhancing high-speed printability when printed on a low-liquid absorbing printing medium, the content of a high-boiling point organic solvent having a boiling point of not lower than 250° C. in the ink is not more than 4% by mass.

The boiling point of the water-soluble organic solvent (C) as used herein means a standard boiling point (boiling point as measured at 1 atm). In the case where the organic solvent used herein contains two or more organic solvents, the boiling point of the organic solvent means a weighted mean value of boiling points of the two or more organic solvents which are respectively weighted by contents (% by mass) of the two or more water-soluble organic solvents contained in the organic solvent.

Examples of the water-soluble organic solvent (C) include an alcohol, an alkyl ether of the alcohol, a glycol ether, a nitrogen-containing heterocyclic compound such as N-methyl-2-pyrrolidone, etc., an amide, an amine, a sulfur-containing compound, and the like. Among these compounds, preferred is at least one compound selected from the group consisting of a polyhydric alcohol (c-1) and a glycol ether (c-2). It is more preferred that the water-soluble organic solvent (C) contains at least the polyhydric alcohol (c-1).

(Polyhydric Alcohol)

Examples of the polyhydric alcohol include 1,2-alkanediols having not less than 2 and not more than 10 carbon atoms, such as ethylene glycol (boiling point: 197° C.; in this paragraph, the numerical value in the respective parentheses represents a boiling point of the respective compounds), propylene glycol (1,2-propanediol) (188° C.), 1,2-butanediol (194° C.), 1,2-pentanediol (210° C.), 1,2-hexanediol (224° C.), 1,2-octanediol (131° C.), 1,2-decanediol (255° C.), etc.; 1,3-alkanediols having not less than 3 and not more than 8 carbon atoms, such as 1,3-propanediol (230° C.), 2-methyl-1,3-propanediol (214° C.), 3-methyl-1,3-butanediol (203° C.), 2-ethyl-1,3-hexanediol (244° C.), etc.; polyalkylene glycols such as dipropylene glycol (231° C.), diethylene glycol (244° C.), etc.; and 1,2,6-hexanetriol (178° C.), 1,2,4-butanetriol (190° C.), 1,2,3-butanetriol (175° C.), petriol (216° C.), etc.

In addition, the high-boiling point organic solvent having a boiling point of not lower than 250° C., such as 1,6-hexanediol (250° C.), triethylene glycol (285° C.), tripropylene glycol (273° C.), polypropylene glycol (not lower than 250° C.), glycerin (290° C.), etc., may be used in combination with the aforementioned compounds having a boiling point of lower than 250° C. The content of the high-boiling point organic solvent in the water-based ink is not more than 4% by mass.

Among these polyhydric alcohols, from the viewpoint of forming ink dots having a complete circular shape and improving image quality and rub fastness of the resulting printed material, preferred is at least one compound selected from the group consisting of alkanediols having not less than 2 and not more than 6 carbon atoms, such as propylene glycol, diethylene glycol, 1,2-hexanediol, etc., and more preferred is at least one compound selected from the group consisting of alkanediols having not less than 3 and not more than 4 carbon atoms, such as propylene glycol, diethylene glycol, etc., and even more preferred is propylene glycol (188° C.).

(Glycol Ether)

Specific examples of the glycol ether include alkylene glycol monoalkyl ethers, alkylene glycol dialkyl ethers and the like. Among these glycol ethers, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol propyl ether, diethylene glycol isobutyl ether, diethylene glycol butyl ether, triethylene glycol methyl ether, triethylene glycol isobutyl ether, tetraethylene glycol methyl ether, propylene glycol ethyl ether, dipropylene glycol butyl ether, dipropylene glycol methyl ether, tripropylene glycol methyl ether, tripropylene glycol butyl ether and the like.

Of these alkylene glycol monoalkyl ethers, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of diethylene glycol isopropyl ether (iPDG; boiling point: 207° C.), diethylene glycol isobutyl ether (iBDG; boiling point: 220° C.) and diethylene glycol butyl ether (boiling point: 231° C.).

The aforementioned water-soluble organic solvents (C) may be used alone or in the form of a mixture of any two or more thereof.

<Surfactant (D)>

The water-based ink of the present invention contains a silicone-based surfactant (d-1) and an acetylene glycol-based surfactant (d-2) from the viewpoint of forming ink dots having a complete circular shape and improving image quality and rub fastness of the resulting printed material.

(Silicone-Based Surfactant (d-1))

From the same viewpoint as described above, the silicone-based surfactant (d-1) is preferably a polyether-modified silicone-based surfactant.

The polyether-modified silicone-based surfactant is capable of suppressing increase in viscosity of the resulting ink. Therefore, it is considered that the polyether-modified silicone-based surfactant contributes to production of good printed materials that are free of mottling or unevenness upon high-speed printing.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

The HLB (hydrophilic-lipophilic balance) value of the polyether-modified silicone-based surfactant is preferably not less than 2.0, more preferably not less than 3.0, even more preferably not less than 4.0 and further even more preferably not less than 4.5 from the viewpoint of improving solubility of the polyether-modified silicone-based surfactant in the water-based ink. The term "HLB" value as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

HLB=20×[(molecular weight of hydrophilic group contained in surfactant)/(molecular weight of surfactant)]

In addition, from the same viewpoint as described above, the kinematic viscosity of the polyether-modified silicone-based surfactant as measured at 25° C. is preferably not less than 40 mm$^2$/s, more preferably not less than 50 mm$^2$/s and even more preferably not less than 60 mm$^2$/s, and is also preferably not more than 1000 mm$^2$/s, more preferably not more than 900 mm$^2$/s and even more preferably not more than 800 mm$^2$/s. Meanwhile, the kinematic viscosity may be measured using a Ubbelohde viscometer.

Specific examples of the polyether-modified silicone-based surfactant include "KF" series products available from Shin-Etsu Chemical Co., Ltd., such as "KF-351A", "KF-352A", "KF-353", "KF-354L", "KF-355A", "KF-615A", "KF-945", "KF-640", "KF-642", "KF643", "KF-644", "KF6020", "KF6011", etc.; "SILFACE SAG" available from Nissin Chemical Co., Ltd.; "BYK" series products available from BYK Chemie Japan K.K.; and the like.

Of these polyether-modified silicone-based surfactants, preferred are "KF" series products available from Shin-Etsu Chemical Co., Ltd.

(Acetylene Glycol-Based Surfactant (d-2))

The acetylene glycol-based surfactant (d-2) is capable of maintaining an adequate surface tension of the water-based ink or an adequate interfacial tension between the water-based ink and members of a printer, and has substantially no foamability. In addition, the acetylene glycol-based surfactant (d-2) exhibits properties of facilitating wet-spread of the water-based ink over a printing medium, etc., and also exhibits properties capable of further improving storage stability of the water-based ink under high-temperature conditions.

As the acetylene glycol-based surfactant (d-2), there may be mentioned an acetylene glycol compound represented by the following general formula (1).

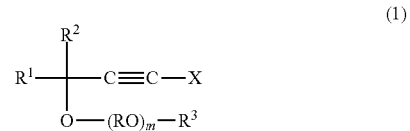

(1)

In the formula (1), $R^1$ and $R^2$ are each independently a hydrogen atom or an alkyl group having 1 to 16 carbon atoms; $R^3$ is a hydrogen atom, an alkyl group having 1 to 6 carbon atoms or a phenyl group; R is an alkylene group having 2 to 6 carbon atoms; m represents an average molar number of addition of RO, and is a number of 0 to 40; X is a hydrogen atom or a group represented by the following general formula (2); and the aforementioned alkyl group and phenyl group may be partially substituted with a substituent group.

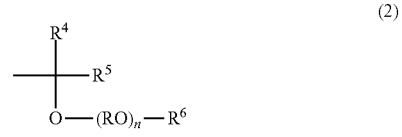

(2)

In the formula (2), $R^4$ and $R^5$ are each independently a hydrogen atom or an alkyl group having 1 to 16 carbon atoms; $R^6$ is a hydrogen atom, an alkyl group having 1 to 6 carbon atoms or a phenyl group; R is the same as described above; n represents an average molar number of addition of RO, and is a number of 0 to 40; and the aforementioned alkyl group and phenyl group may be partially substituted with a substituent group.

In the general formulae (1) and (2), as the substituent group of $R^1$ to $R^6$, there may be mentioned an alkoxy group having 1 to 4 carbon atoms, a halogen atom, and the like.

$R^1$, $R^2$, $R^4$ and $R^5$ are respectively a linear or branched alkyl group preferably having 1 to 12 carbon atoms and more preferably 1 to 8 carbon atoms, or a cyclic alkyl group having 3 to 8 carbon atoms.

$R^3$ and $R^6$ are respectively preferably a hydrogen atom or an alkyl group having 1 to 4 carbon atoms, and more preferably a hydrogen atom.

R is preferably an alkylene group having 2 to 4 carbon atoms, more preferably an alkylene group having 2 or 3 carbon atoms, and even more preferably an ethylene group.

In the general formula (1), when m is 0 (m=0), $R^3$ is a hydrogen atom, and when n is 0 (n=0), $R^6$ is a hydrogen atom. In addition, when X is a hydrogen atom, m is a number of 1 to 50, preferably 1 to 40 and more preferably 1 to 30.

Among the compounds represented by the general formula (1), more preferred are compounds represented by the following general formula (3).

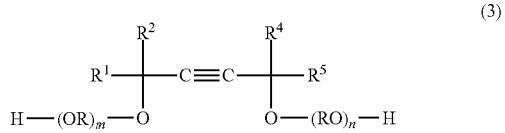

(3)

In the general formula (3), $R^1$, $R^2$, $R^4$, $R^5$, R, m and n have the same meanings as $R^1$, $R^2$, $R^4$, $R^5$, R, m and n in the general formulae (1) and (2), and the preferred ranges of $R^1$, $R^2$, $R^4$, $R^5$, R, m and n in the general formula (3) are also respectively the same as those in the general formulae (1) and (2).

A sum of the average molar numbers m and n (m+n) of addition of alkyleneoxide (RO) is preferably not less than 1 and more preferably not less than 1.1, and is also preferably not more than 45, more preferably not more than 40, even more preferably not more than 30, further even more preferably not more than 20 and still further even more preferably not more than 15. If the sum (m+n) lies within the aforementioned range, a good balance between hydrophilicity and hydrophobicity of the ink can be maintained, so that the resulting ink can exhibit good wettability.

In the formula (3), $R^1$, $R^2$, $R^4$ and $R^5$ are each independently preferably a hydrogen atom or an alkyl group having 1 to 16 carbon atoms, more preferably a linear or branched alkyl group having 1 to 8 carbon atoms, or a cyclic alkyl group having 3 to 8 carbon atoms.

Examples of the aforementioned alkyl group include a methyl group, an ethyl group, a propyl group, an isopropyl group, a butyl group, an isobutyl group, a 2-butyl group, a t-butyl group, a hexyl group, a cyclohexyl group, an octyl group, and the like.

When $R^1$ and $R^5$ are respectively a linear or branched alkyl group, the number of carbon atoms in the alkyl group is preferably from 1 to 6, more preferably from 1 to 4 and even more preferably from 1 to 3, and it is particularly preferred that $R^1$ and $R^5$ are respectively a methyl group.

$R^2$ and $R^4$ are respectively preferably an alkyl group having 3 to 6 carbon atoms, more preferably an alkyl group having 4 or 5 carbon atoms, and even more preferably an isobutyl group.

More specifically, among the compounds represented by the general formula (3), more preferred are compounds represented by the following general formula (4).

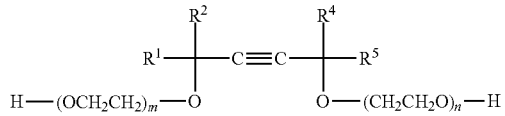

(4)

In the general formula (4), $R^1$, $R^2$, $R^4$, $R^5$, m and n have the same meanings as $R^1$, $R^2$, $R^4$, $R^5$, m and n in the general formula (3), and the preferred ranges of $R^1$, $R^2$, $R^4$, $R^5$, m and n in the general formula (4) are also respectively the same as those of $R^1$, $R^2$, $R^4$, $R^5$, m and n in the general formula (3).

The sum (m+n) is also the same as described previously, i.e., preferably not less than 1 and more preferably not less than 1.1, and is also preferably not more than 45, more preferably not more than 40, even more preferably not more than 30, further even more preferably not more than 20 and still further even more preferably not more than 15.

The compound represented by the general formula (1), (3) or (4) can be synthesized by conventionally known methods, and may be obtained, for example, by the method described in Takehiko Fujimoto, a fully revised edition "New Introduction to Surfactants", 1992, pp. 94-107, etc.

Examples of the acetylene glycol-based surfactant (d-2) used in the present invention include acetylene-based diols such as 2,4,7,9-tetramethyl-5-decyne-4,7-diol, 3,6-dimethyl-4-octyne-3,6-diol, 3,5-dimethyl-1-hexyne-3-ol, 2,4-dimethyl-5-hexyne-3-ol, 2,5-dimethyl-3-hexyne-2,5-diol, 2,5,8,11-tetramethyl-6-dodecyne-5,8-diol, etc., and ethyleneoxide adducts of these compounds, i.e., those adducts represented by the general formula (3) or (4).

Specific examples of commercially available products of the aforementioned compounds include "SURFYNOL 104", "SURFYNOL 420", "SURFYNOL 440", "SURFYNOL 465", "SURFYNOL 485", "SURFYNOL 504", "SURFYNOL TO", "OLFINE E1004", "OLFINE E1010", "OLFINE E1020", "OLFINE STG" and "OLFINE Y" all available from Nissin Chemical Co., Ltd., and Air Products & Chemicals, Inc.; and "ACETYLENOL E40", "ACETYLENOL E100" and "ACETYLENOL E200" all available from Kawaken Fine Chemicals Co., Ltd.; and the like.

Of these acetylene glycol-based surfactants, preferred are compounds represented by the aforementioned formulae in which the sum (m+n) is preferably from 0 to 30 and more preferably from 0 to 10. Examples of such compounds include "SURFYNOL 420" (m+n=1.3), "SURFYNOL 440" (m+n=3.5), "SURFYNOL 465" (m+n=10.0), "SURFYNOL 485" (m+n=30.0) and "OLFINE E1010" all available from Nissin Chemical Co., Ltd., and "ACETYLENOL E100" and "ACETYLENOL E200"; "ACETYLENOL E40" (m+n=4), "ACETYLENOL E60" (m+n=6), "ACETYLENOL E81" (m+n=8) and "ACETYLENOL E100" (m+n=10) all available from Kawaken Fine Chemicals Co., Ltd.; and the like.

These surfactants (D) may be used alone or in the form of a mixture of any two or more thereof.

(Other Surfactants)

The water-based ink of the present invention may further contain the other surfactants than the silicone-based surfactant (d-1) and the acetylene glycol-based surfactant (d-2) from the viewpoint of forming ink dots having a complete circular shape and improving image quality and rub fastness of the resulting printed material. Among these other surfactants, preferred is a nonionic surfactant.

Examples of the nonionic surfactant include polyoxyethylene alkyl phenyl ethers, polyoxyethylene aralkyl aryl ethers, polyoxyethylene alkyl ethers and the like. Examples of commercially available products of these nonionic surfactants include "EMULGEN" available from Kao Corporation, NOIGEN" available from DKS Co., Ltd., and the like.

[Contents of Respective Components in Water-Based Ink and Properties of Water-Based Ink]

The water-based ink of the present invention may be obtained by appropriately mixing the aforementioned components and then stirring the resulting mixture. The contents of the respective components in the resulting water-based ink as well as various properties of the water-based ink are as follows.

(Content of Pigment (A))

The content of the pigment (A) in the water-based ink is preferably not less than 2% by mass, more preferably not less than 4% by mass and even more preferably not less than 5% by mass from the viewpoint of enhancing optical density of the water-based inks upon printing. Also, the content of the pigment (A) in the water-based ink is preferably not more than 30% by mass, more preferably not more than 20% by mass, even more preferably not more than 15% by mass and further even more preferably not more than 10% by mass from the viewpoint of reducing viscosity of the water-based ink upon volatilization of the solvent therefrom as well as from the viewpoint of improving image quality and rub fastness of the resulting printed material.

(Content of Polymer (B))

The content of the polymer (B) in the water-based ink is preferably not less than 1% by mass, more preferably not less than 2% by mass and even more preferably not less than 3% by mass, and is also preferably not more than 20% by mass, more preferably not more than 13% by mass and even more preferably not more than 8% by mass, from the viewpoint of improving dispersibility of the pigment and fixing properties of the water-based ink.

In the case where the polymer (B) is used as the pigment dispersing polymer, the content of the pigment dispersing polymer (b-1) in the water-based ink is preferably not less than 0.1% by mass, more preferably not less than 0.5% by mass and even more preferably not less than 1% by mass, and is also preferably not more than 10% by mass, more preferably not more than 7% by mass and even more preferably not more than 5% by mass, from the viewpoint of improving dispersibility of the pigment.

In the case where the polymer (B) is used as the fixing aid polymer, the content of the fixing aid polymer (b-2) in the water-based ink is preferably not less than 0.1% by mass, more preferably not less than 0.2% by mass and even more preferably not less than 0.5% by mass, and is also preferably not more than 6% by mass, more preferably not more than 4% by mass and even more preferably not more than 3% by mass, from the viewpoint of improving fixing properties of the water-based ink.

Meanwhile, when using the particles of the water-insoluble polymer (bx) containing the pigment, the content of the polymer (B) in the water-based ink as used herein means a total content of the pigment dispersing polymer (b-1) of the pigment-containing polymer particles and the fixing aid polymer (b-2).

(Content of Water-Soluble Organic Solvent (C))

The content of the water-soluble organic solvent (C) in the water-based ink is preferably not less than 15% by mass, more preferably not less than 20% by mass and even more preferably not less than 25% by mass, and is also preferably not more than 48% by mass, more preferably not more than 45% by mass and even more preferably not more than 40% by mass, from the viewpoint of improving continuous ejection properties of the resulting ink.

The content of the polyhydric alcohol (c-1) in the water-based ink is preferably not less than 10% by mass, more preferably not less than 15% by mass and even more preferably not less than 20% by mass, and is also preferably not more than 45% by mass, more preferably not more than 40% by mass and even more preferably not more than 35% by mass, from the viewpoint of improving storage stability of the resulting ink.

The content of the glycol ether (c-2) in the water-based ink is preferably not less than 0.2% by mass, more preferably not less than 0.5% by mass and even more preferably not less than 0.8% by mass, and is also preferably not more than 15% by mass, more preferably not more than 10% by mass and even more preferably not more than 8% by mass, from the viewpoint of improving storage stability of the resulting ink.

The content of a high-boiling point organic solvent having a boiling point of not lower than 250° C. in the water-based ink of the present invention is preferably not more than 4% by mass, more preferably not more than 3% by mass, even more preferably not more than 1% by mass and further even more preferably 0% by mass from the viewpoint of improving high-speed printing properties of the resulting ink.

(Content of Surfactant (D))

The content of the surfactant (D) in the water-based ink is preferably not less than 0.1% by mass, more preferably not less than 0.2% by mass and even more preferably not less than 0.5% by mass, and is also preferably not more than 5% by mass, more preferably not more than 4% by mass, even more preferably not more than 3% by mass and further even more preferably not more than 2.5% by mass, from the viewpoint of forming ink dots having a complete circular shape and improving image quality and rub fastness of the resulting printed material.

From the same viewpoint as described above, the content of the silicone-based surfactant (d-1) in the water-based ink is preferably not less than 0.01% by mass, more preferably not less than 0.03% by mass and even more preferably not less than 0.05% by mass, and is also preferably not more than 3% by mass, more preferably not more than 2% by mass and even more preferably not more than 1.5% by mass.

From the same viewpoint as described above, the content of the acetylene glycol-based surfactant (d-2) in the water-based ink is preferably not less than 0.03% by mass, more preferably not less than 0.08% by mass and even more preferably not less than 0.1% by mass, and is also preferably not more than 4% by mass, more preferably not more than 3% by mass and even more preferably not more than 2% by mass.

In the water-based ink of the present invention, from the viewpoint of forming ink dots having a complete circular shape and improving image quality and rub fastness of the resulting printed material, the content of the silicone-based surfactant (d-1), the content of the acetylene glycol-based surfactant (d-2) and the content of the water-soluble organic solvent (C) satisfy the following conditions 1 and 2:

[(content of component (d-1))/(content of component (C))]×100=0.15 to 4; and    Condition 1:

[(content of component (d-2))/(content of component (C))]×100=0.35 to 1.65.    Condition 2:

From the same viewpoint as described above, the value of the condition 1 is preferably not less than 0.2, more preferably not less than 0.3, even more preferably not less than 0.5 and further even more preferably not less than 0.8, and is also preferably not more than 4, more preferably not more than 3.5, even more preferably not more than 3.2 and further even more preferably not more than 3.

From the same viewpoint as described above, the value of the condition 2 is preferably not less than 0.4, more preferably not less than 0.5, even more preferably not less than 0.6 and further even more preferably not less than 0.7, and is also preferably not more than 1.6, more preferably not more than 1.5 and even more preferably not more than 1.4.

(Content of Water)

The content of water in the water-based ink is not less than 40% by mass, preferably not less than 45% by mass and more preferably not less than 50% by mass, and is also not more than 65% by mass and preferably not more than 60% by mass, from the viewpoint of forming ink dots having a complete circular shape and improving image quality and rub fastness of the resulting printed material. When the content of water in the water-based ink is more than 65% by mass, it tends to be difficult to maintain the complete circular shape of the ink dots.

Furthermore, in the water-based ink of the present invention, from the viewpoint of forming ink dots having a complete circular shape and improving image quality and rub fastness of the resulting printed material, it is preferred that the content of water and the content of the water-soluble organic solvent (C) satisfy the following condition 3:

[(content of water)/(content of component (C))]× 100=120 to 220.    Condition 3:

From the same viewpoint as described above, the value of the condition 3 is preferably not less than 135, more preferably not less than 150, even more preferably not less than 155 and further even more preferably not less than 160, and is also preferably not more than 210, more preferably not more than 200, even more preferably not more than 190 and further even more preferably not more than 175.

The water-based ink of the present invention may also contain, in addition to the aforementioned components, various ordinary additives that may be usually used in water-based inks, such as a humectant, a wetting agent, a penetrant, a defoaming agent, an antiseptic agent, a mildew-proof agent, a rust preventive, etc.

The water-based ink of the present invention preferably contain no radical-polymerizable compound from the viewpoint of ensuring safety and reducing occurrence of unpleasant smell upon printing characters or images on food packages, etc.

<Properties of Water-Based Ink>

The average particle size of the particles contained in the water-based ink is preferably not less than 40 nm, more preferably not less than 60 nm and even more preferably not less than 80 nm, and is also preferably not more than 250 nm, more preferably not more than 220 nm, even more preferably not more than 200 nm and further even more preferably not more than 180 nm, from the viewpoint of improving storage stability of the resulting water-based ink.

From the viewpoint of forming ink dots having a complete circular shape and improving image quality and rub fastness of the resulting printed material, the static surface tension of the water-based ink as measured at 20° C. is preferably not less than 20 mN/m, more preferably not less than 21 mN/m and even more preferably not less than 22 mN/m, and is also preferably not more than 45 mN/m, more preferably not more than 40 mN/m and even more preferably not more than 35 mN/m.

The static surface tension of the ink may be adequately controlled, for example, by suitably selecting the kind or content of the water-soluble organic solvent (C) or the surfactant (D).

The viscosity of the water-based ink as measured at 32° C. is preferably not less than 2 mPa·s, more preferably not less than 3 mPa·s and even more preferably not less than 4 mPa·s, and is also preferably not more than 12 mPa·s, more preferably not more than 9 mPa·s and even more preferably not more than 7 mPa·s, from the viewpoint of forming ink dots having a complete circular shape and improving image quality and rub fastness of the resulting printed material.

The pH value of the water-based ink is preferably not less than 7.0, more preferably not less than 8.0, even more preferably not less than 8.5 and further even more preferably not less than 8.7 from the viewpoint of improving image quality and rub fastness of the resulting printed material, and is also preferably not more than 11.0 and more preferably not more than 10.0 from the viewpoint of improving resistance of members to the water-based ink and suppressing skin irritation.

Meanwhile, the average particle size, static surface tension and viscosity may be respectively measured by the methods described in Examples below.

[Printing Method]

The printing method of the present invention includes the step of printing characters or images on a low-liquid absorbing printing medium using the water-based ink of the present invention.

As the printing method, there is preferably used an ink-jet printing method.

In the ink-jet printing method, after ejecting at least one ink selected from the group consisting of a black ink and chromatic inks onto a low-liquid absorbing printing medium to print characters or images thereon, a white ink may be ejected thereonto to form the printed characters or images with a white background. If required, in order to fix the ejected inks on the printing medium, there may be further provided heating and fixing/curing/drying means.

(Low-Liquid Absorbing Printing Medium)

Examples of the low-liquid absorbing printing medium used in the present invention include a low-liquid absorbing coated paper and a resin film. Among these printing media, from the viewpoint of improving solid image fillability, preferred is the resin film. The low-liquid absorbing printing medium may be in the form of either a sheet of paper or a roll of paper. However, from the viewpoint of enhancing productivity of printed materials, a roll-shaped printing medium is preferably used. As the low-liquid absorbing printing medium used in the present invention, preferred is such a printing medium that is not subjected to any pretreatments such as application of a treating solution thereonto, etc.

The water absorption of the low-liquid absorbing printing medium per unit surface area thereof is preferably not less than 0 g/m$^2$ and not more than 6 g/m$^2$ as measured under such a condition that a contact time between a substrate of the low-liquid absorbing printing medium and pure water is 100 milliseconds. From the viewpoint of exhibiting the effect of improving solid image fillability, the water absorption of the low-liquid absorbing printing medium is more preferably not less than 0 g/m$^2$ and not more than 4.5 g/m$^2$ and even more preferably not less than 0 g/m$^2$ and not more than 2.5 g/m$^2$.

Examples of commercially available products of the coated paper include a versatile glossy coated paper "OK Topcoat Plus" (basis weight: 104.7 g/m$^2$; water absorption as measured in a water contact time of 100 milliseconds (hereinafter defined in the same way): 4.9 g/m$^2$) available from Oji Paper Co., Ltd., a multi-color foam glossy coated paper (basis weight: 104.7 g/m$^2$; water absorption: 5.2 g/m$^2$) available from Oji Paper Co., Ltd., "UPM Finesse Gloss" (basis weight: 115 g/m$^2$; water absorption: 3.1 g/m$^2$) available from UPM-Kymmene Oyj, "UPM Finesse Matt" (basis weight: 115 g/m$^2$; water absorption: 4.4 g/m$^2$) available from UPM-Kymmene Oyj, "TerraPress Silk" (basis weight: 80 g/m$^2$; water absorption: 4.1 g/m$^2$) available from Stora Enso AB, and the like.

As the resin film, there may be used a transparent synthetic resin film. Examples of the transparent synthetic resin film include a polyester film, a polyvinyl chloride film, a polypropylene film, a polyethylene film, a nylon film and the like. These resin films may be in the form of either a biaxially oriented film, a monoaxially oriented film or a non-oriented film. Among these films, preferred are a polyester film and an oriented polypropylene film, and more preferred are a polyester film such as a polyethylene terephthalate (PET) film subjected to corona discharge treatment, etc., and an oriented polypropylene film such as a biaxially oriented polypropylene (OPP) film subjected to corona discharge treatment, etc.

The thickness of the resin film is not particularly limited, and the resin film may be in the form of a thin film having a thickness of from 1 μm to less than 20 μm. However, the thickness of the resin film is preferably not less than 20 μm, more preferably not less than 30 μm and even more preferably not less than 35 μm, and is also preferably not more than 100 μm, more preferably not more than 80 μm and even more preferably not more than 75 μm, from the viewpoint of suppressing deterioration in appearance of the printing medium as well as from the viewpoint of improving availability of the printing medium.

Examples of commercially available products of the transparent synthetic resin film include "LUMIRROR T60" (PET; water absorption: 2.3 g/m$^2$) available from Toray Industries, Inc., "TAIKO FE2001" (corona discharge-treated PET; water absorption: 0 g/m$^2$) available from Futamura Chemical Co, Ltd., "TAIKO FOR-AQ" (corona discharge-treated OPP) available from Futamura Chemical Co., Ltd., "PVC80B P" (polyvinyl chloride; water absorption: 1.4 g/m$^2$) available from Lintec Corporation, "KINATH KEE 70CA" (polyethylene) available from Lintec Corporation, "YUPO SG90 PAT1" (PP) available from Lintec Corporation, "BONYL RX" (nylon) available from Kohjin Film & Chemicals Co., Ltd., and the like.

(Printing Method)

In the present invention, there may be used any of a serial-type print head and a line-type print head. Of these print heads, the line-type print head is preferably used in the present invention. In the printing method using the line-type print head, while maintaining the print head in a stationery state and moving the printing medium along a transportation direction thereof, droplets of the ink are ejected from openings of nozzles of the print head in association with the movement of the printing medium to allow the ink droplets to adhere onto the printing medium, whereby it is possible to print characters or images, etc., thereon by a single-pass (one-pass) method.

The ink droplets are preferably ejected by a piezoelectric method. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method for ejecting the ink droplets.

The voltage applied to the print head is preferably not less than 5 V, more preferably not less than 10 V and even more preferably not less than 15 V, and is also preferably not more than 40 V, more preferably not more than 35 V and even more preferably not more than 30 V, from the viewpoint of conducting the high-speed printing with high efficiency, etc.

The drive frequency of the print head is preferably not less than 2 kHz, more preferably not less than 5 kHz and even more preferably not less than 8 kHz, and is also preferably not more than 80 kHz, more preferably not more than 70 kHz and even more preferably not more than 60 kHz, from the viewpoint of conducting the high-speed printing with high efficiency, etc.

(Printing Conditions, etc.)

The amount of the ink droplets ejected is preferably not less than 0.5 pL, more preferably not less than 1.0 pL, even more preferably not less than 1.5 pL and further even more preferably not less than 1.8 pL, and is also preferably not more than 20 pL, more preferably not more than 15 pL and even more preferably not more than 13 pL, as calculated per one ink droplet ejected, from the viewpoint of maintaining accuracy of impact positions of the ink droplets and improving image quality of the resulting printed material.

The print head resolution is preferably not less than 400 dpi (dot/inch), more preferably not less than 500 dpi and even more preferably not less than 550 dpi.

From the viewpoint of reducing viscosity of the water-based ink and improving continuous ejection properties of the water-based ink, the inside temperature of the print head, preferably a line-type print head, upon the printing, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The printing speed is usually not less than 5 m/min, preferably not less than 10 m/min, more preferably not less than 20 m/min and even more preferably not less than 30 m/min in terms of a transportation speed of the printing medium in the direction along which the printing medium is moved upon the printing, from the viewpoint of enhancing productivity of the printed material, and is also preferably not more than 75 m/min in terms of the transportation speed of the printing medium, from the viewpoint of improving operability of the printing apparatus.

The amount of the water-based ink adhered onto the printing medium is preferably not less than 0.1 g/m$^2$, and is also preferably not more than 25 g/m$^2$ and more preferably not more than 20 g/m$^2$, in terms of a solid content thereof, from the viewpoint of improving image quality of the resulting printed material and increasing the printing speed.

EXAMPLES

In the following Synthesis Example, Production Examples, Examples and Comparative Examples, the "part(s)" and "%" indicate "part(s) by mass" and "% by mass", respectively, unless otherwise specified. Meanwhile, the methods of measuring respective properties and characteristics, etc., are as follows.

(1) Measurement of Weight-Average Molecular Weight of Polymer

The weight-average molecular weight of the polymer was measured by gel permeation chromatography [GPC apparatus: "HLC-8120GPC" available from Tosoh Corporation;

columns: "TSK-GEL, α-M"×2 available from Tosoh Corporation; flow rate: 1 mL/min] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using monodisperse polystyrenes having previously known molecular weights as a reference standard substance.

(2) Measurement of Average Particle Sizes of Pigment-Containing Polymer Particles and Polymer Particles in Water Dispersion or Ink The water dispersion or ink was subjected to cumulant analysis using a laser particle analyzing system "ELSZ-1000" available from Otsuka Electrics Co., Ltd., to measure an average particle size of particles therein. The water dispersion or ink to be measured was diluted with water so as to adjust a concentration of the water dispersion or ink to $5\times10^{-3}\%$ by mass in terms of a solid content thereof. The measurement was conducted under the conditions including a temperature of 25° C., an angle between incident light and detector of 165° and a cumulative number of 100 times, and a refractive index of water (1.333) was input to the analyzing system as a refractive index of the dispersing medium. The thus determined cumulant average particle size was defined as the average particle size of the particles in the water dispersion or ink.

(3) Measurement of Solid Content of Pigment Water Dispersion

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Viscosity of Water-Based Ink

The viscosity of the water-based ink was measured at 32° C. using an E-type viscometer "TV-25" (equipped with a standard cone rotor (1° 34'×R24); rotating speed: 50 rpm) available from Toki Sangyo Co., Ltd.

(5) Measurement of Static Surface Tension of Water-Based Ink

A platinum plate was dipped in 5 g of the water-based ink filled in a cylindrical polyethylene container (3.6 cm in diameter×1.2 cm in depth), and the static surface tension of the water-based ink was measured at 20° C. using a surface tension meter "CBVP-Z" (tradename) available from Kyowa Interface Science Co., Ltd.

(6) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

(7) Water Absorption of Printing Medium as Measured by Contacting Printing Medium with Pure Water for 100 Milliseconds Using an automatic scanning absorptometer "KM500win" available from Kumagai Riki Kogyo Co., Ltd., the amount of pure water transferred to a printing medium when contacted with pure water for 100 milliseconds was measured at 23° C. under a relative humidity of 50%. The thus measured amount of pure water transferred to the printing medium was determined as a water absorption of the printing medium as measured in a pure water contact time of 100 milliseconds. The measuring conditions are shown below.

| "Spiral Method" | |
|---|---|
| Contact time: 0.010 to 1.0 (sec) | |
| Pitch (mm): 7 | |
| Length Per Sampling (degree): 86.29 | |
| Start Radius (mm): 20 | End Radius (mm): 60 |
| Min Contact Time (ms): 10 | Max Contact Time (ms): 1000 |
| Sampling Pattern (1-50): 50 | |
| Number of Sampling Points (>0): 19 | |
| "Square Head" | |
| Split Span (mm): 1 | Split Width (mm): 5 |

Synthesis Example 1 (Synthesis of Black Pigment Dispersing Polymer)

Sixteen parts of methacrylic acid available from FUJIFILM Wako Pure Chemical Corporation, 44 parts of styrene available from FUJIFILM Wako Pure Chemical Corporation, 30 parts of a styrene macromonomer "AS-6S" (number-average molecular weight: 6,000; solid content: 50%) available from Toagosei Co., Ltd., and 25 parts of methoxypolyethylene glycol monomethacrylate (PEGMA) "BLEMMER PME-200" (tradename; average molar number of addition of ethyleneoxide (EO): n=4) available from NOF Corporation were mixed with each other to prepare 115 parts of a monomer mixture solution.

Eighteen parts of methyl ethyl ketone and 0.03 part of 2-mercaptoethanol as a chain transfer agent as well as 10% (11.5 parts) of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% (103.5 parts) of the monomer mixture solution, 0.27 part of the aforementioned chain transfer agent, 42 parts of methyl ethyl ketone and 3 parts of 2,2'-azobis(2,4-dimethylvaleronitrile) "V-65" as a polymerization initiator available from FUJIFILM Wako Pure Chemical Corporation, was charged into a dropping funnel. In a nitrogen atmosphere, the mixture solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the reaction vessel, and the resulting reaction solution was further aged at 75° C. for 2 hours and then at 80° C. for 2 hours, followed by further adding 50 parts of methyl ethyl ketone thereto, thereby obtaining a solution of a water-insoluble polymer (having a weight-average molecular weight of 50,000). The solid content of the thus obtained water-insoluble polymer solution was 45% by mass.

Production Example 1 (Production of Water Dispersion of Black Pigment-Containing Polymer Particles)

Added into a solution prepared by dissolving 95.2 parts of the water-insoluble polymer solution obtained in Synthesis Example 1 in 53.9 parts of methyl ethyl ketone were 15.0 parts of a 5N sodium hydroxide aqueous solution and 0.5 part of a 25% ammonia aqueous solution both acting as a neutralizing agent as well as 341.3 parts of ion-exchanged water. Furthermore, 100 parts of C.I. Pigment Black 7 (P.B. 7) as a carbon black pigment available from Cabot Corporation were added to the resulting mixture to prepare a pigment mixed solution. The degree of neutralization of the polymer in the thus prepared pigment mixed solution was 78.8 mol %. The pigment mixed solution was stirred at 20° C. for 60 minutes using a disper "Ultra Disper" (tradename) available from Asada Iron Works Co., Ltd., under the condition of rotating a disper blade thereof at 7000 rpm. The resulting dispersion liquid was subjected to dispersion treatment under a pressure of 180 MPa using a Microfluidizer "High-Pressure Homogenizer M-140K" available from Microfluidics Corporation by passing the dispersion through the device 15 times.

The thus obtained dispersion liquid of the pigment-containing polymer particles was maintained at 60° C. under reduced pressure to remove methyl ethyl ketone therefrom, followed by further removing a part of water therefrom. The resulting dispersion was subjected to centrifugal separation, and a liquid layer portion separated therefrom was subjected to filtration treatment through a filter "Minisart Syringe Filter" (pore size: 5 μm; material: cellulose acetate) available from Sartorius Inc., to remove coarse particles therefrom, thereby obtaining a water dispersion of the pigment-containing polymer particles. The solid content of the thus obtained water dispersion was 25% by mass.

Then, 0.45 part of an epoxy crosslinking agent "DENACOL EX 321L" (tradename; trimethylolpropane polyglycidyl ether; epoxy equivalent: 130) available from Nagase ChemteX Corporation and 15.23 parts of ion-exchanged water were added to 100 parts of the resulting water dispersion of the pigment-containing polymer particles, and the obtained mixture was subjected to heat treatment at 70° C. for 3 hours while stirring (solid content: 22.0% by mass). After cooling the obtained dispersion to room temperature, a liquid layer portion separated therefrom was subjected to filtration treatment through a filter "Minisart Syringe Filter" (pore size: 5 μm; material: cellulose acetate) available from Sartorius Inc., to remove coarse particles therefrom, thereby obtaining a water dispersion of the black pigment-containing polymer particles (solid content: 22.0% by mass). The average particle size of the black pigment-containing polymer particles in the resulting water dispersion was 100 nm.

Production Examples 2 to 4 (Production of Water Dispersions of Color Pigment-Containing Polymer Particles)

The same procedure as in Production Example 1 was repeated except that the kind and amount of the pigment added as well as the amount of "DENACOL EX 321L" added were changed, thereby obtaining water dispersions of cyan pigment-, magenta pigment- and yellow pigment-containing polymer particles.

Meanwhile, the details of the pigments shown in Table 1 are as follows.

Cyan: C.I. Pigment Blue 15:3 available from DIC Corporation

Magenta: C.I. Pigment Red 150 available from Fuji Pigment Co., Ltd.

Yellow; C.I. Pigment Yellow 74 available from Dainichiseika Color & Chemicals Mfg. Co., Ltd.

TABLE 1

| | | | Production Examples | | | |
|---|---|---|---|---|---|---|
| | | | 1 | 2 | 3 | 4 |
| Water dispersion | Pigment | (Color) | Black | Cyan | Magenta | Yellow |
| | | (Kind) | P.B. 7 | P.B. 15:3 | P.R. 150 | P.Y. 74 |
| | Solid content (%) | | 22.0 | 22.0 | 22.0 | 22.0 |
| | Ratio of pigment introduced (%) | | 68.8 | 68.5 | 68.5 | 68.5 |
| Composition (part(s)) | Pigment (A) | | 15.13 | 15.08 | 15.08 | 15.08 |
| | Pigment dispersing polymer obtained in Synthesis Example 1 | | 6.48 | 6.46 | 6.46 | 6.46 |
| | "DENACOL EX 321L" | | 0.39 | 0.46 | 0.46 | 0.46 |
| | Ion-exchanged water | | 78.0 | 78.0 | 78.0 | 78.0 |
| | Total | | 100.0 | 100.0 | 100.0 | 100.0 |
| Properties | Average particle size (nm) | | 100 | 100 | 155 | 115 |
| | Viscosity at 32° C. (mPa · s) | | 4.2 | 3.9 | 4.2 | 4.0 |
| | pH | | 9.9 | 9.8 | 9.9 | 9.9 |

Production Example 5 (Production of Fixing Aid Polymer Emulsion)

A 1000 mL-capacity separable flask was charged with 145 parts of methyl methacrylate available from FUJIFILM Wako Pure Chemical Corporation, 50 parts of 2-ethylhexyl acrylate available from FUJIFILM Wako Pure Chemical Corporation, 5 parts of methacrylic acid available from FUJIFILM Wako Pure Chemical Corporation, 18.5 parts of "LATEMUL E118B" (emulsifier; active ingredient content: 26%) available from Kao Corporation, 96 parts of ion-exchanged water and potassium persulfate available from FUJIFILM Wako Pure Chemical Corporation, and the contents of the flask were stirred using a stirring blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with nitrogen gas. In a nitrogen atmosphere, the contents of the reaction vessel were heated to 80° C. while stirring with a stirring blade (200 rpm), and then the aforementioned monomer emulsion was charged into a dropping funnel and added dropwise into the reaction vessel over 3 hours to subject the monomer emulsion to polymerization reaction. The resulting reaction solution was mixed with ion exchanged water to thereby obtain a fixing aid polymer emulsion having a solid content of 41.6% by weight. The average particle size of the thus obtained fixing aid polymer emulsion was 100 nm.

Example 1 (Production of Black Water-Based Ink 1)

A mixed solution was prepared by mixing 508.9 parts of the water dispersion of the black pigment-containing polymer particles (solid content: 22.0% by mass) obtained in Production Example 1, 21.8 parts of the fixing aid polymer emulsion (solid content: 41.6% by weight) obtained in Production Example 5, 363.0 parts of propylene glycol, 11.0 parts of diethylene glycol monoisobutyl ether (iBDG), 1.1 parts of a silicone-based surfactant "KF-6011" (kinematic viscosity as measured at 25° C.: 130 mm$^2$/s; HLB: 12) available from Shin-Etsu Chemical Co., Ltd., 5.5 parts of an acetylene glycol-based surfactant "SURFYNOL 440" (an ethyleneoxide (3.5 mol) adduct of 2,4,7,9-tetramethyl-5-decyne-4,7-diol; active ingredient content: 100%) available from Nissin Chemical Co., Ltd., and 188.8 parts of ion-exchanged water with each other. The resulting mixed solution was subjected to filtration treatment by passing through a filter "Minisart Syringe Filter" (pore size: 5.0 μm; material: cellulose acetate) available from Sartorius Inc., thereby obtaining a black water-based ink 1. The total amount of the aforementioned components compounded in the ink was 1100.0 parts.

Examples 2 to 5 and Comparative Examples 1 to 6 (Production of Respective Color Water-Based Inks 2 to 11)

The same procedure as in Example 1 was repeated except that the composition of the water-based ink was changed to those shown in Table 2, thereby obtaining respective color water-based inks 2 to 11. The total amount of the components compounded in the respective color water-based inks was 1100.0 parts.

<Evaluation of Water-Based Inks>

Using the water-based inks 1 to 5 obtained in Examples 1 to 5, respectively, and the water-based inks 6 to 11 obtained in Comparative Examples 1 to 6, respectively, printed materials were produced by the following ink-jet printing method.

The resulting printed materials were subjected to evaluation of complete circularity of ink dots, evaluation of solid image fillability and evaluation of rub fastness according to the following methods and evaluation ratings. The results are shown in Table 2.

<Production of Printed Material by Ink-Jet Printing Method>

A corona discharge-treated PET "TAIKO Polyester Film FE2001" (water absorption as measured by contacting the printing medium with pure water for 100 milliseconds: 0 g/m$^2$) available from Futamura Chemical Co., Ltd., was prepared as a printing medium.

Under the environmental conditions of a temperature of 25±1° C. and a relative humidity of 30±5%, the respective water-based inks 1 to 11 were loaded into a one-pass system print evaluation apparatus available from Trytech Co., Ltd., equipped with an ink-jet print head "KJ4B-HD06MHG-STDV" (piezoelectric type) available from Kyocera Corporation.

The operating conditions of the print evaluation apparatus were set to a head applied voltage of 26 V, a drive frequency of 10 kHz, an ejected ink droplet amount of 3 pL, a head temperature of 32° C., a head resolution of 600 dpi, the number of ink shots for flushing before being ejected of 200 shots and a negative pressure of −4.0 kPa, and the printing medium was fixed in the print evaluation apparatus such that the longitudinal direction of the printing medium was aligned with a transportation direction thereof.

The print evaluation apparatus was equipped with the ink-jet print head for ejecting the respective water-based inks onto the printing medium, and an under heater for heating the printing medium from a rear side surface of the printing medium which was opposed to a front side surface thereof which faced to the ink-jet print head. The distance between the under heater and the printing medium was set to 0.25 mm, and the distance between the ink-jet print head and the printing medium was set to 1.0 mm, and further the surface temperature of the under heater was adjusted to 55° C. (temperature of printing medium: 50° C.). An A4-size film heater available from Kawai Corporation was fixedly mounted to a transportation table for the printing medium so as to heat the printing medium. The transportation speed of the printing medium was adjusted to 25 m/min.

A printing command was transmitted to the aforementioned print evaluation apparatus to print Duty 100% solid images of the respective water-based inks 1 to 11 and Duty 10% images capable of determining a shape of dots of the respective water-based inks 1 to 11 on the printing medium. Thereafter, the thus printed images on the printing medium were dried by a hot air dryer at 60° C. for 5 minutes, thereby obtaining a printed material.

<Method for Evaluation of Complete Circularity of Dots of Ink on Printed Material>

The Duty 10% image portion capable of ascertaining the shape of respective dots of the ink on the printed material was visually observed in a magnified view thereof to judge whether or not any dots whose shape was deformed and deviated from a complete circular shape were present in the image portion, and the number of the dots whose shape was deformed and deviated from a complete circular shape was counted to calculate the ratio of the number of the deformed dots to a total number of dots of the ink on the image portion. Furthermore, an average value of the aforementioned dot number ratios measured at a plurality of positions on the image portion was calculated to compare degrees of complete circularity of the respective dots and evaluate the complete circularity of the dots of the ink according to the following evaluation ratings.

(Evaluation Ratings)

A: The average value was less than 10%, and almost no dots having a low complete circularity were ascertained.

B: The average value was not less than 10% and less than 50%, and some dots having a low complete circularity were ascertained, but posed no significant problems upon practical use.

C: The average value was not less than 50%, and the dots were considerably deteriorated in complete circularity, and therefore posed significant problems upon practical use.

<Evaluation of Solid Image Fillability of Printed Material>

The Duty 100% solid image portion was visually observed in a magnified view thereof to ascertain lack of filling of the solid image portion and unevenness of density of the solid image portion and thereby evaluate solid image fillability of the ink according to the following evaluation ratings.

(Evaluation Ratings)

A: Neither lack of filling of the solid image portion nor unevenness of density of the solid image portion was observed.

B: Less than 5% of a surface area of the solid image portion suffered from lack of filling and unevenness of density thereof, but posed no significant problems upon practical use.

C: Not less than 5% and less than 10% of a surface area of the solid image portion suffered from unevenness of density thereof, but posed no significant problems upon practical use.

D: Not less than 10% of a surface area of the solid image portion suffered from unevenness of density thereof, and posed significant problems upon practical use.

<Evaluation of Rub Fastness of Printed Material>

A weight load of 1 g was applied onto a surface of the Duty 100% solid image portion of the printed material to rub the printed surface therewith by one reciprocative motion. The change of the printed surface during the rubbing test was visually observed to evaluate rub fastness of the respective water-based inks according to the following evaluation ratings.

(Evaluation Ratings)

A: No change of the printed surface was visually observed.

B: Change in color tone and peeling of the ink were visually observed on less than 5% of the tested portion of the printed surface, but posed no significant problems upon practical use.

C: Change in color tone and peeling of the ink were visually observed on not less than 5% and less than 10% of the tested portion of the printed surface, but posed no significant problems upon practical use.

D: Change in color tone and peeling of the ink were visually observed on not less than 10% of the tested portion of the printed surface, and therefore posed significant problems upon practical use.

TABLE 2-1

|  | Examples |  |  |  |  | Comparative Examples |  |  |  |  |  |
| --- | --- | --- | --- | --- | --- | --- | --- | --- | --- | --- | --- |
|  | 1 | 2 | 3 | 4 | 5 | 1 | 2 | 3 | 4 | 5 | 6 |
|  | No. of ink set |  |  |  |  |  |  |  |  |  |  |
|  | Ink set 1 |  |  |  |  | Ink set 2 |  |  |  |  |  |
| No. of water-based ink | 1 | 2 | 3 | 4 | 5 | 6 | 7 | 8 | 9 | 10 | 11 |
| Color of water-based ink | B* | C* | M* | Y* | B* | C* | M* | Y* | B* | B* | B* |
| Composition of water-based ink (part(s)) |  |  |  |  |  |  |  |  |  |  |  |
| Black color pigment water dispersion | 508.9 | — | — | — | 407.2 | — | — | — | 407.2 | 290.8 | 508.9 |
| Cyan color pigment water dispersion | — | 408.6 | — | — | — | 408.6 | — | — | — | — | — |
| Magenta color pigment water dispersion | — | — | 408.6 | — | — | — | 408.6 | — | — | — | — |
| Yellow color pigment water dispersion | — | — | — | 408.6 | — | — | — | 408.6 | — | — | — |
| Fixing aid polymer emulsion | 21.8 | 75.1 | 128.1 | 48.5 | 102.4 | 75.1 | 101.6 | 75.1 | 22.8 | 21.8 | 21.8 |
| Propylene glycol (C) | 363.0 | 330.0 | 352.0 | 308.0 | 286.0 | 429.0 | 330.0 | 330.0 | 297.0 | 242.0 | 363.0 |
| iBDG (C) | 11.0 | 44.0 | 11.0 | 22.0 | 44.0 | 11.0 | 0.0 | 33.0 | 33.0 | 44.0 | 11.0 |
| Glycerin (C) | 0.0 | 0.0 | 0.0 | 0.0 | 0.0 | 0.0 | 0.0 | 0.0 | 0.0 | 0.0 | 55.0 |
| Silicone-based surfactant (d-1) | 1.1 | 5.5 | 11.0 | 1.1 | 1.1 | 0.4 | 16.5 | 1.1 | 1.1 | 11.0 | 1.1 |
| Acetylene glycol-based surfactant (d-2) | 5.5 | 5.5 | 5.5 | 3.3 | 1.7 | 6.6 | 5.0 | 1.1 | 9.9 | 4.4 | 5.5 |
| Ion-exchanged water | 188.8 | 231.3 | 183.7 | 308.4 | 257.7 | 169.3 | 238.3 | 251.1 | 329.0 | 486.0 | 133.7 |

Note:
B*: Black;
C*: Cyan;
M*: Magenta;
Y*: Yellow

TABLE 2-2

|  |  | Examples |  |  |  |  | Comparative Examples |  |  |  |  |  |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
| Boiling point of organic solvent (C) (° C.)[1] | | 190.9 | 193.5 | 190.9 | 192.0 | 194.0 | 190.8 | 190.0 | 192.7 | 193.0 | 194.6 | 203.6 |
| Content of organic solvent (C) (%) | | 34.0 | 34.0 | 33.0 | 30.0 | 30.0 | 50.0 | 30.0 | 33.0 | 30.0 | 23.0 | 39.0 |
| Content of water (%) | | 54.4 | 54.0 | 52.5 | 59.6 | 57.7 | 48.3 | 56.0 | 55.8 | 60.0 | 66.0 | 49.4 |
| [(d-1)/C] × 100 | | 0.3 | 1.5 | 3.0 | 0.3 | 0.3 | 0.1 | 5.0 | 0.3 | 0.3 | 3.8 | 0.3 |
| [(d-2)/C] × 100 | | 1.5 | 1.5 | 1.5 | 1.0 | 0.5 | 1.5 | 1.5 | 0.3 | 3.0 | 1.5 | 1.3 |
| Properties | Average particle size (nm) | 93.8 | 99.5 | 157.6 | 113.0 | 94.0 | 100.7 | 162.2 | 112.1 | 93.6 | 93.2 | 88.6 |
|  | Viscosity at 32° C. (mPa · s) | 5.8 | 5.5 | 5.9 | 5.1 | 4.8 | 6.8 | 6.1 | 5.9 | 5.6 | 4.6 | 7.3 |
|  | Static surface tension (mN/m) | 31.5 | 24.9 | 22.8 | 28.5 | 31.0 | 38.5 | 38.7 | 33.5 | 29.8 | 24.3 | 31.7 |
|  | pH | 9.8 | 9.3 | 9.1 | 9.0 | 9.5 | 9.0 | 8.8 | 9.2 | 9.7 | 9.6 | 9.7 |
| Evaluation | Complete circularity of dots (%) | A | A | A | A | A | A | A | A | C | C | B |
|  | Solid image fillability (%) | A | A | A | B | C | D | A | D | A | A | C |
|  | Rub fastness (%) | A | B | C | A | A | A | D | A | A | C | D |

Note:
[1]Weighted mean value of boiling points of water-soluble organic solvents in the organic solvent (C) which were weighted by contents (% by mass) of the respective water-soluble organic solvents.

As is apparent from the comparison between Example 2 and Comparative Example 1, the comparison between Example 3 and Comparative Example 2, the comparison between Example 4 and Comparative Example 3 and the comparison between Example 5 and Comparative Example 4 in Table 2, it was confirmed that the water-based inks obtained in the Examples according to the present invention were free of deterioration in complete circularity of dots of the ink on the printed material and solid image fillability, and were capable of providing printed characters or images which were excellent in rub fastness, as compared to the water-based inks obtained in the Comparative Examples.

In addition, from Comparative Example 5, it was confirmed that when the content of water in the water-based ink exceeded 65% by mass, the water-based ink was deteriorated in complete circularity of dots thereof. Furthermore, it was confirmed that the water-based ink of Comparative Example 6 containing not only 5% by mass of glycerin (boiling point: 290° C.), but also more than 4% by mass of the water-soluble organic solvent having a boiling point exceeding 250° C., failed to obtain printed characters or images which were excellent in solid image fillability and rub fastness, when used in high-speed printing at a transportation speed of 25 m/min.

INDUSTRIAL APPLICABILITY

According to the water-based ink and the ink-jet printing method of the present invention, it is possible to form dots of the ink having a complete circular shape, and obtain printed characters or images which are excellent in solid image fillability, image quality and rub fastness even when printed on a low-liquid absorbing printing medium.

The invention claimed is:

1. A water-based ink comprising a pigment (A), a water-soluble organic solvent (C), a surfactant (D) and water, in which:
   a content of water in the water-based ink is not less than 45% by mass and not more than 60% by mass, a boiling point of the water-soluble organic solvent (C) is not higher than 230° C., and a content of a high-boiling point organic solvent having a boiling point of not lower than 250° C. in the water-based ink is not more than 4% by mass; and
   the surfactant (D) comprises a silicone-based surfactant (d-1) and an acetylene glycol-based surfactant (d-2) which satisfy the following conditions 1 and 2:

[(content of component (d-1))/(content of component (C))]×100=0.15 to 4; and    Condition 1;

[(content of component (d-2))/(content of component (C))]×100=0.35 to 1.5    Condition 2.

2. The water-based ink according to claim 1, wherein the water-soluble organic solvent (C) comprises at least one compound selected from the group consisting of a polyhydric alcohol (c-1) and a glycol ether (c-2).

3. The water-based ink according to claim 1, wherein a content of the water-soluble organic solvent (C) in the water-based ink is not less than 15% by mass and not more than 48% by mass.

4. The water-based ink according to claim 2, wherein a content of the glycol ether (c-2) in the water-based ink is not less than 0.2% by mass and not more than 15% by mass.

5. The water-based ink according to claim 1, wherein a content of the silicone-based surfactant (d-1) in the water-based ink is not less than 0.01% by mass and not more than 3% by mass.

6. The water-based ink according to claim 1, wherein a content of the acetylene glycol-based surfactant (d-2) in the water-based ink is not less than 0.03% by mass and not more than 2% by mass.

7. The water-based ink according to claim 1, wherein the content of water and the content of the water-soluble organic solvent (C) in the water-based ink satisfy the following condition 3:

Condition 3: [(content of water)/(content of component (C))]×100=120 to 220.

8. The water-based ink according to claim 1, further comprising a vinyl-based polymer.

9. The water-based ink according to claim 8, wherein a weight-average molecular weight of the vinyl-based polymer is not less than 10,000 and not more than 2,500,000.

10. The water-based ink according to claim 8, wherein the pigment is present in the form of pigment-containing water-insoluble polymer particles; the water-insoluble polymer is a vinyl-based polymer that comprises a constitutional unit derived from an ionic monomer and a constitutional unit derived from a hydrophobic monomer; and a content of the constitutional unit derived from the ionic monomer in the water-insoluble polymer is not less than 3% by mass and not more than 40% by mass.

11. The water-based ink according to claim 10, wherein the water-insoluble polymer is an anionic water-insoluble polymer comprising an anionic group, and is in the form of a crosslinked polymer obtained by crosslinking reaction with a compound comprising 2 or more epoxy groups in a molecule thereof.

12. The water-based ink according to claim 11, wherein the compound comprising 2 or more epoxy groups in a molecule thereof is trimethylolpropane polyglycidyl ether.

13. The water-based ink according to claim 1, wherein a static surface tension of the water-based ink as measured at 20° C. is not less than 22 mN/m and not more than 45 mN/m.

14. The water-based ink according to claim 1, wherein a viscosity of the water-based ink as measured at 32° C. is not less than 2 mPa·s and not more than 12 mPa·s.

15. The water-based ink according to claim 1 for ink-jet printing.

16. A printing method comprising the step of printing characters or images on a low-liquid absorbing printing medium using the water-based ink according to claim 1.

17. The printing method according to claim 16, wherein the low-liquid absorbing printing medium is a corona discharge-treated polyester film or a corona discharge-treated oriented polypropylene film.

* * * * *